United States Patent
Adrian

(10) Patent No.: US 9,607,662 B1
(45) Date of Patent: Mar. 28, 2017

(54) SEALING AND ENCLOSURE SYSTEM FOR DISC DRIVES

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/996,176

(22) Filed: Jan. 14, 2016

(51) Int. Cl.
*G11B 33/06* (2006.01)
*G11B 33/14* (2006.01)
*G11B 33/12* (2006.01)

(52) U.S. Cl.
CPC ............ *G11B 33/06* (2013.01); *G11B 33/142* (2013.01); *G11B 33/1466* (2013.01); *G11B 33/124* (2013.01)

(58) Field of Classification Search
CPC ... G11B 33/142; G11B 33/128; G11B 33/124; G11B 33/06; G11B 33/1466; G06F 1/187; G06F 1/181
See application file for complete search history.

(56) References Cited

U.S. PATENT DOCUMENTS

| | | | | | |
|---|---|---|---|---|---|
| 4,977,532 A | * | 12/1990 | Borkowicz | ............... | G06F 1/18 361/741 |
| 5,086,422 A | * | 2/1992 | Hagiya | ................ | G11B 7/0037 360/99.18 |
| 5,242,217 A | * | 9/1993 | Gonnet | ............... | A47B 21/0073 312/194 |
| 5,255,254 A | * | 10/1993 | Watanabe | .......... | G11B 17/0405 360/99.02 |
| 5,297,116 A | * | 3/1994 | Ikuma | .................. | G11B 33/142 369/13.34 |
| 5,301,178 A | * | 4/1994 | Okabe | .................. | G11B 17/043 360/99.18 |
| 5,493,457 A | * | 2/1996 | Kawamura | .......... | G11B 33/142 360/97.12 |
| 5,549,375 A | * | 8/1996 | Pagliaccio | ......... | A47B 88/0451 312/223.2 |
| 5,691,860 A | * | 11/1997 | Hoppe | ............... | G11B 23/0316 360/133 |
| 5,716,114 A | * | 2/1998 | Holmes | ............... | E05B 47/0607 312/215 |
| 5,841,744 A | * | 11/1998 | Menke | ................. | G11B 17/225 360/98.06 |
| 6,011,701 A | * | 1/2000 | Kopp | ..................... | A47B 21/00 312/223.2 |
| 6,231,145 B1 | * | 5/2001 | Liu | ........................ | G06F 1/184 312/223.2 |

(Continued)

*Primary Examiner* — Brian Miller
(74) *Attorney, Agent, or Firm* — Perkins Coie LLP

(57) ABSTRACT

A disc-drive enclosure system comprising an enclosure assembly having an interior area, a divider separating the interior area into two chambers. An opening in the divider receives the end of a disc drive the a disc tray being openable into the first chamber, while the disc drive's body remains in the second chamber. A sled assembly in the enclosure assembly support the disc drive and is movable relative to the divider between first and second positions. The sled assembly has a sealing member coupled to a leading end portion and positioned to form a seal around the drive opening when the sled assembly is in the first position with the end portion of the housing in the first chamber and the body portion in the second chamber.

16 Claims, 6 Drawing Sheets

(56) References Cited

U.S. PATENT DOCUMENTS

| | | | | |
|---|---|---|---|---|
| 6,659,292 B2* | 12/2003 | Gough | H05K 7/1421 | 211/26 |
| 7,042,716 B2* | 5/2006 | Shearman | A47B 21/0314 | 312/223.2 |
| 7,164,579 B2* | 1/2007 | Muncaster | E05C 19/06 | 324/73.1 |
| 7,167,359 B2* | 1/2007 | Wendel | G11B 33/128 | 211/41.17 |
| 7,327,564 B2* | 2/2008 | Carlson | G11B 33/128 | 312/223.1 |
| 7,343,608 B2* | 3/2008 | Noshimoto | G11B 33/027 | 720/647 |
| 7,565,667 B2* | 7/2009 | Matsui | G11B 33/142 | 720/606 |
| 7,983,040 B2* | 7/2011 | Campbell | H05K 7/20236 | 165/104.33 |
| 7,990,709 B2* | 8/2011 | Campbell | H05K 7/20745 | 165/104.33 |
| 8,205,220 B2* | 6/2012 | Kim | G11B 17/056 | 720/601 |
| 8,477,488 B2* | 7/2013 | Aldridge | G06F 1/187 | 361/679.33 |
| 8,582,298 B2* | 11/2013 | Facusse | H05K 7/20809 | 165/104.33 |
| 2006/0080686 A1* | 4/2006 | Liedenbaum | G11B 17/0407 | 720/601 |

* cited by examiner

SEALING AND ENCLOSURE SYSTEM FOR DISC DRIVES

TECHNICAL FIELD

This patent application is directed to systems for accommodating disc drives, and more specifically, to systems that isolate disc drives.

BACKGROUND

Operation of optical storage devices typically occurs in a controlled environment with a minimum level of dust, airborne contaminants or other undesirable particles, which can degrade performance of the optical storage devices. The optical storage devices also typically need to be manually accessible for maintenance or repair from time to time, during which the optical storage devices are at least partially removed from the controlled environment to allow personnel to physically access the storage device. Therefore, it is desirable to have a system that can properly operatively contain these optical storage devices in a sealed, controlled environment, while accommodating the need for maintenance or repair.

BRIEF DESCRIPTION OF THE DRAWINGS

Embodiments of the sealing and enclosure systems introduced herein may be better understood by referring to the following Detailed Description in conjunction with the accompanying drawings, in which like reference numerals indicate identical or functionally similar elements.

Figure 1:
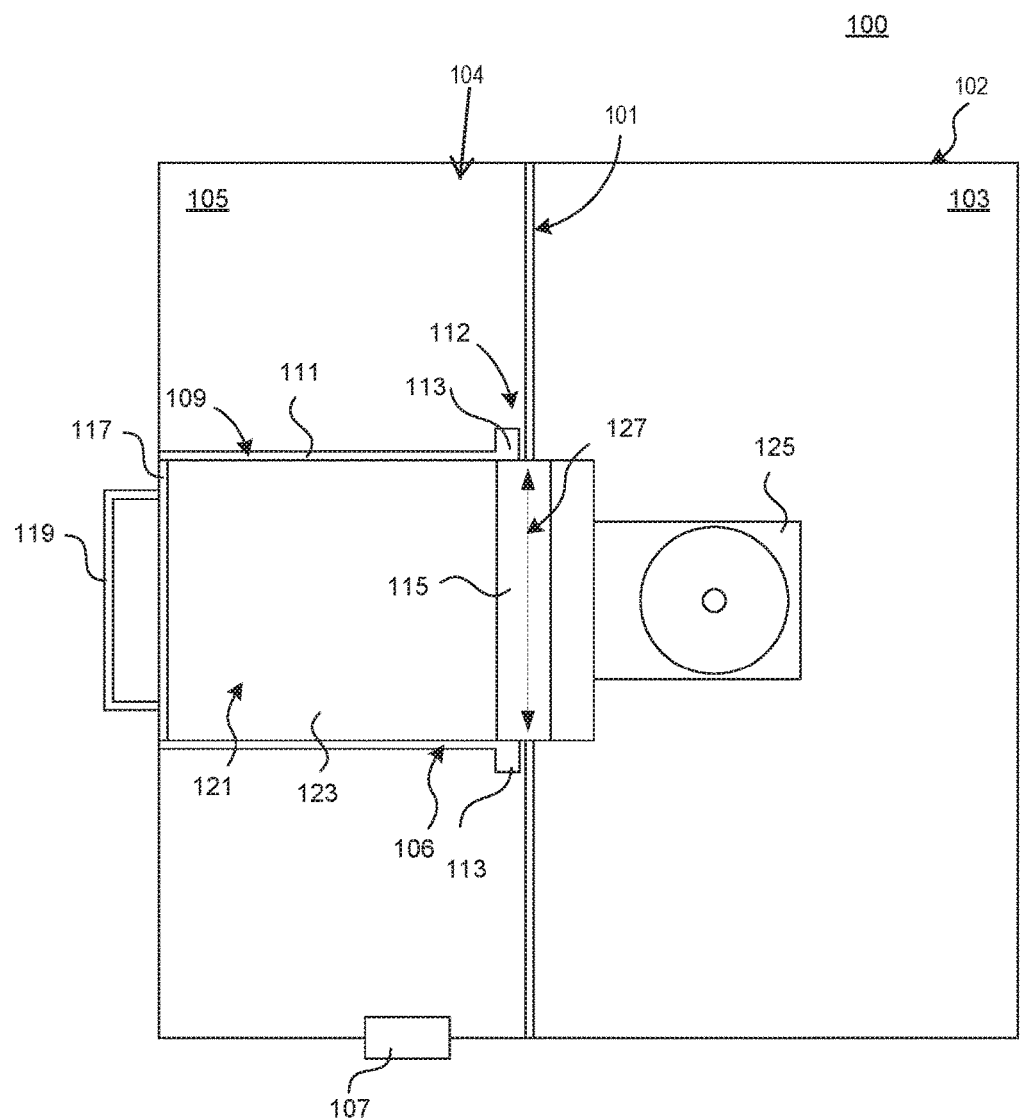
FIG. 1 is a top view illustrating an enclosure system in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

An optical drive enclosure system for use in an optical disc storage and retrieval system is disclosed. The enclosure separates the optical drive from the media storage and transport areas of the system. Thus, the optical drive can be cooled by fans without introducing dust into the media storage and transport areas of the system. The optical drive is mounted to a sled assembly, which is slidably mounted in the enclosure such that the drive may be accessed for service when the sled assembly is in an open position. The sled assembly includes a front panel with a handle and a sealing flange on the opposite end. When the sled assembly is in a closed position, the sealing flange abuts against a divider of the enclosure adjacent to a drive opening through which an end of the disc drive extends, whereby the optical drive housing is partitioned from the drive tray end of the optical drive. Accordingly, any contamination (e.g., dust) in the enclosure is prevented from reaching the disc tray. The optical drive can open (i.e., extend the disc tray) without contamination entering the optical drive or contaminating other media stored in the media storage and transport areas of the system. A flange gasket is disposed around the flange to help seal the interface between the flange and enclosure wall around the drive opening and the end of the disc drive.

In one embodiment, the enclosure system includes an enclosure assembly having a divider separating an interior area into first and second chambers. A system operator can control the environments of these two chambers. For example, the first chamber can be a clean area free of undesirable particles and particulates, which enables the operator to load/unload discs to/from the disc drive within the first chamber. The second chamber can be an area with a controlled temperature and airflow environment, such that the disc drive can be properly operated therein. The divider includes a drive opening configured to receive the end portion of the disc drive's housing with the disc tray being openable into the first chamber, while the rest of the housing remains in the second chamber. The enclosure system includes a sled assembly movably connected to the enclosure assembly and configured to support the disc drive. The sled assembly and the disc drive are movable relative to the divider between closed and open positions. The sled assembly includes a sealing member positioned to form a seal around the drive opening when the sled assembly is in the closed position (during which the disc drive can be operated in the second chamber, and a disc can be loaded to or unloaded from the disc drive in the first chamber). When the operator wants to maintain or repair the disc drive, the operator can pull the sled assembly and the disc drive away from the divider to a space where maintenance and/or repair can be properly performed. During this time, the sled assembly is in the open position. Once completed, the operator can move the sled assembly back to the closed position with the seal maintained between the first and second chambers and continue to operate the disc drive.

General Description

Various examples of the systems and their components introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 is a top view illustrating an enclosure system 100 in accordance with an embodiment of the present technology. The enclosure system 100 includes a housing 102 with an interior area 104. In some embodiments, at least a portion of the interior area 104 is a controlled environment, whereas the area exterior of the housing 102 can be a substantially uncontrolled or ambient environment. The housing 102 has a divider 101 that divides the interior area 104 into a first area 103 and a second area 105. The central portion of divider 101 has a drive opening 127 shaped and sized to removably receive at least an end portion of an optical disc drive 121. In other embodiments, the drive opening 127 can be positioned in other suitable non-central locations of the divider 101, depending on various design needs.

The enclosure system 100 is configured such that the first area 103 in the housing 102 is a clean, controlled environment suitable for loading/unloading a disc to/from the disc drive 121. In some embodiments, the first area 103 has a substantially controlled condition that substantially prevents uncontrolled airflow and associated particulates from unintentionally passing through the first area 103. The first area 103 can be positively pressured to prevent unwanted particles from entering into the first area 103 by airflow, such that the first area 103 remains substantially free of undesirable particles, contaminants, dust, etc. In some embodiments, the first area 103 can be a chamber, a partition, a clean room, a defined space, etc. In the illustrated embodiment, a ventilation system 107 is coupled to the housing 102 to provide a cooled, controlled environment in the housing's second area 105 suitable for operating the disc drive 121. The ventilation device 107 can include equipment such as air conditioners, air blowers, heat exchangers, fans, etc. In some embodiments, the second area 105 can be a semi open-air environment.

As shown in FIG. 1, the enclosure system 100 includes a drive-carrying assembly 109 within the housing 102. The drive-carrying assembly 109 is configured to carry and position the disc drive 121 within the housing 102 so a at least a portion of the disc drive 121 extends through the drive opening 127 in the divider 101 and into the first area 103, while the remaining portion of the disc drive 121 is in the housing's second area 105. The drive-carrying assembly 109 also acts as a sealing assembly to provide a seal around the disc drive 121 in or adjacent to the drive opening 127 in the divider 101 to block airflow through the drive opening 127 between the first and second areas 103 and 105.

In the illustrated embodiment, the drive-carrying assembly 109 includes a sled 111 slidably positioned in the housing 102 and configured to receive and support the disc drive 121. The sled 111 can be a tray-style sled, a drawer-style sled, or other suitable sled configurations. A sealing member 112 is connected to one end of the sled 111, and a panel 117 with a handle 119 is connected to the other end. The disc drive 121 is securely mounted to the top surface of the sled 111, such that the sled 111 and disc drive 127 move together as a unit relative to the divider 101.

The disc drive 121 includes a drive housing 123 and an openable disc tray 125 movable relative to the drive housing 123 between open and closed positions. The disc tray 125 is closed and positioned in the drive housing 123 when the disc drive 121 reads/writes a disc positioned on the disc tray 125. The disc tray 125 is open and at least partially extending from the drive housing 123 when an operator or a disc-placing device loads a disc on (or removes a disc from) the disc tray 125. As shown in FIG. 1, when the drive-carrying assembly 109 is in a closed, stowed position in the housing 102 with the disc drive 121 positioned on the sled 111, an end portion of the disc drive 121 extends, from the second area 105, through the drive opening 127 to the first area 103. In other embodiments, the disc drive 121 can be positioned in alignment with the divider 101, such that the disc drive 121 is substantially flush with the divider 101 at the drive opening 127, and the disc tray 125 can extend through the drive opening 127 when moved to the open position. Otherwise, when the disc tray 125 is in the closed position within the drive housing 123, the disc tray 125 is in the portion of the disc drive 121 located in the ventilated second area 105.

In the illustrated embodiment shown in FIG. 1, when the sled 111 is in the closed, stowed position, the sealing member 112 is in or immediately adjacent to the drive opening 127 to form a seal around the opening 127 and the disc drive 121. The sealing member 112 of the illustrated embodiment includes a flange 113 and a gasket 115 at a leading end portion 106 of the sled 111. In the illustrated embodiment, the gasket 115 is attached to the flange 113, and gasket is configured to be positioned in sealable engagement with the divider 101 at the drive opening 127. In another embodiment, the gasket 115 can be attached to the divider 101 around the drive opening 127 and positioned to sealably engage the flange 113 when the sled 111 is in the closed, stowed position, thereby forming a substantially airtight seal around the drive opening 127 and/or the disc drive 121. In another embodiment, the gasket 115 can be a seal member, such as a blade seal, attached to the divider 101 and extending partially into the drive opening 127 so as to firmly engage and form a seal around the portion of the disc drive 121 extending through the drive opening 127.

Figure 2:
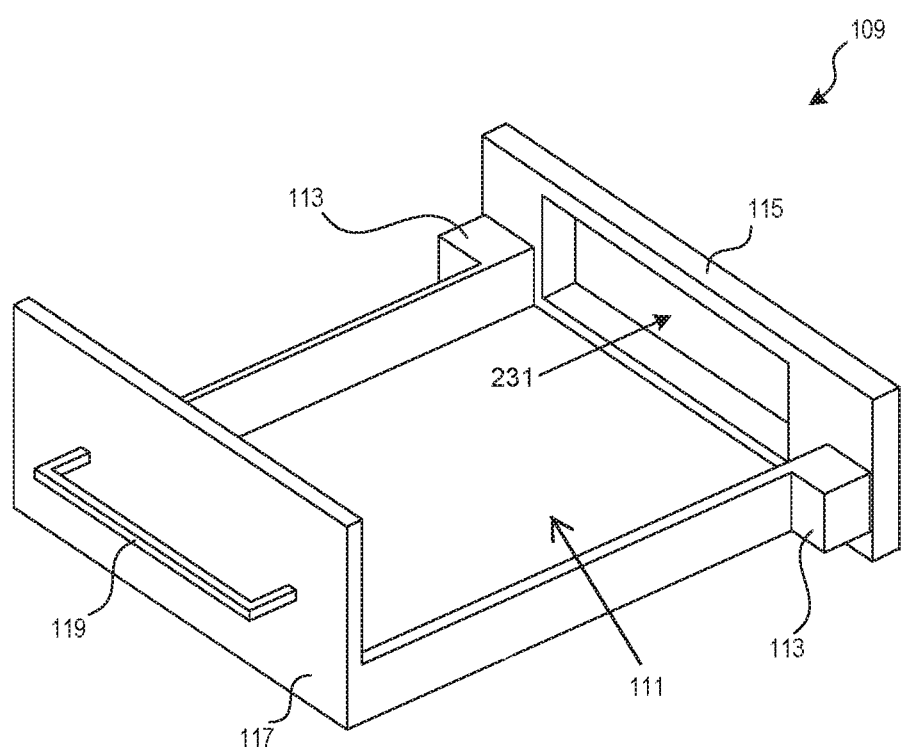
FIG. 2 is an isometric view illustrating a sealing assembly in accordance with an embodiment of the present technology.

FIG. 2 is an enlarged isometric view illustrating the drive-carrying assembly 109 removed from the housing 102. The illustrated drive-carrying assembly 109 has a sliding tray-style sled 111 with the gasket 115 attached to the rear side of the flange 113. The gasket 115 is has a generally rectangular shape sized to extend around the drive opening 127 (FIG. 1) when the drive-carrying assembly 109 is in the closed, stowed position. The gasket 115 has interior aperture 231 shaped and sized to receive the front portion of the disc drive 121 (FIG. 1) and to form a seal around the body of the disc drive 121 positioned on the sled 111. The illustrated embodiment, the gasket 115 is sized to extend radially inwardly from the flange 113 and the bottom of the sled 111, so as to engage the sides and bottom of the disk drive 121 (FIG. 1) when installed on the sled 111. Accordingly, when the drive-carrying assembly 109 is in the closed, stowed position (FIG. 1), a seal is maintained around the disk drive 121 and around the drive opening 127 of the divider 101.

The drive-carrying assembly 109 has the panel 117 connected to the end of the sled 111 opposite to the flange 113 and is configured to protect the disc drive 121 positioned on the sled 111. The handle 119 on the panel 117 is positioned to allow an operator to grasp the handle 119 and pull the drive-carrying assembly 109 away from the divider 101 (FIG. 1) from the closed, stowed position to an open position, such that an operator can maintain or repair the disc drive 121 in the exterior area 104. When the drive-carrying assembly 109 is in the open position, the flange 113 is moved away from the divider, and seal around the drive opening is terminated until the drive-carrying assembly 109 is moved back to the fully closed, stowed position.

Figure 3:
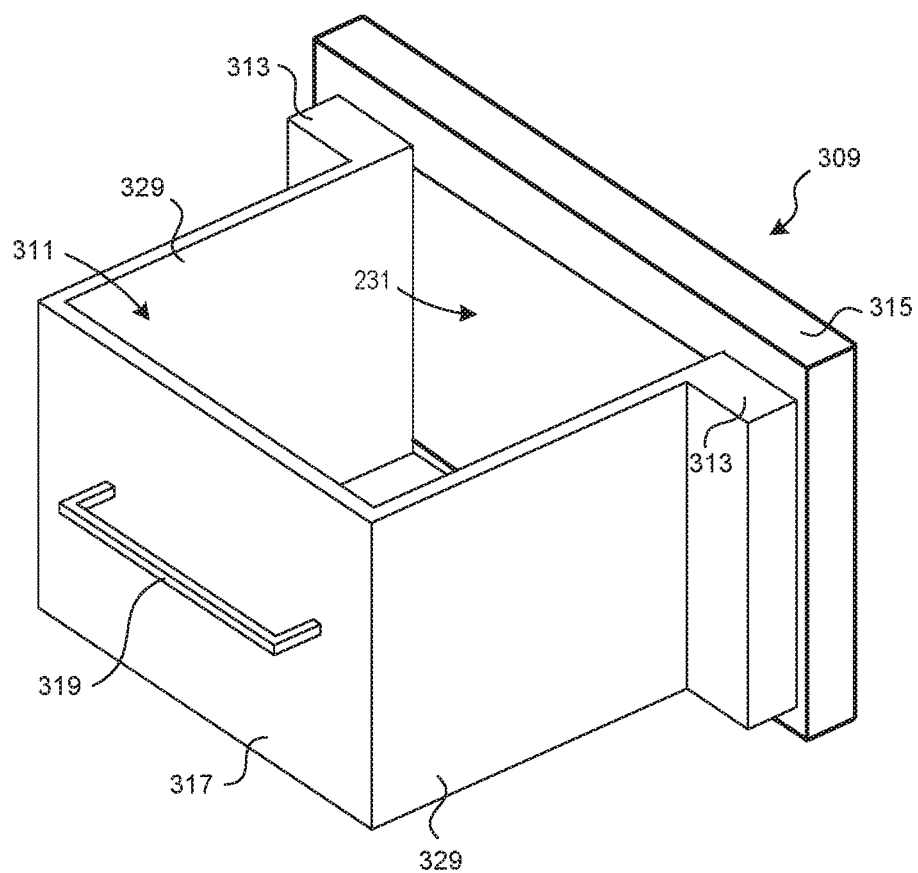
FIG. 3 is an isometric view illustrating a sealing assembly in accordance with another embodiment of the present technology.

FIG. 3 is an isometric view illustrating a drive-carrying assembly 309 in accordance with another embodiment of the present technology. The illustrated drive-carrying assembly 309 has a sliding drawer-style configuration with sidewalls 329 that have substantially the same height as the front panel 317. The flange 313 is connected to the ends of the sidewalls 329, and the gasket 315 is attached to the rear side of the flanges 313. The drawer-style sled 311 is configured to carry and substantially enclose the disc drive 121 (FIG. 1) on at least three sides. The gasket 315 can be directly attached to the flange 313, or directly to the divider 101 (FIG. 1) around the drive opening 127 in a position to sealably engage the flange 313 when the drive-carrying assembly 309 is in the closed, stowed position.

Figure 4:
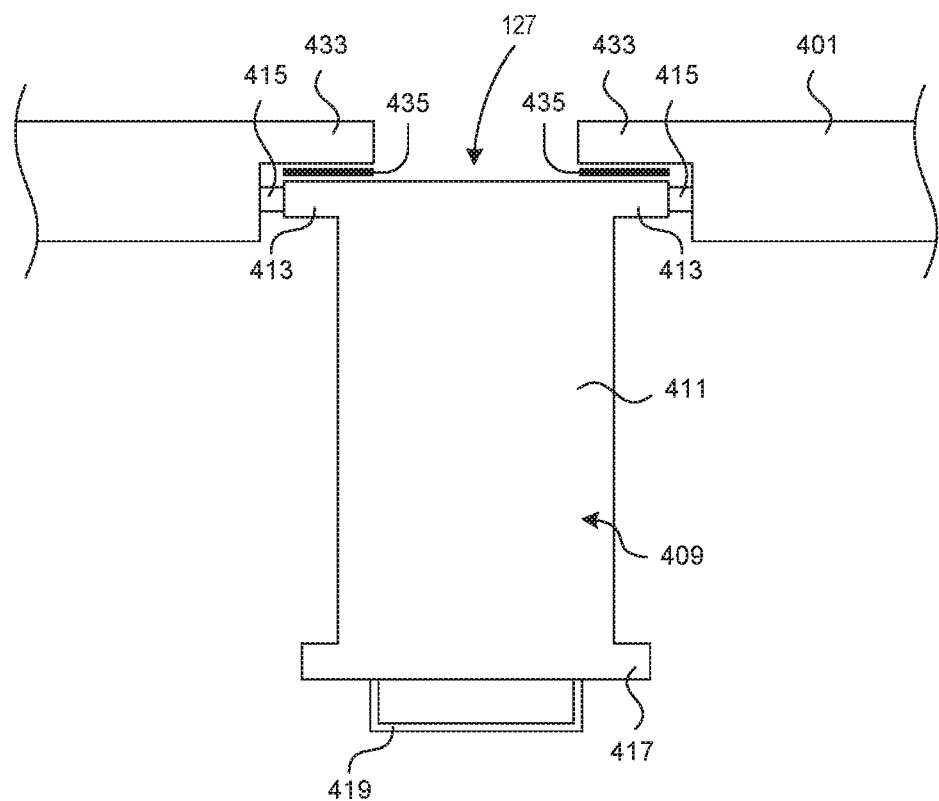
FIG. 4 is a top view of a sealing assembly in accordance with an embodiment of the present technology.

FIG. 4 is a top view of a drive-carrying assembly 409 in accordance with an embodiment of the present technology. The drive-carrying assembly 409 includes a sled (tray-style or drawer-style) 411, a flange 413, a gasket 415, a panel 417, and a handle 419. The flange 413 extends laterally from end of the sled 411, and the gasket 415 is attached to the outboard sides of the flange 413. In the illustrated embodiment, the flange 413 and the gasket 415 can together facilitate sealing the drive opening 127 of a divider 401. The divider 401 includes a protrusion 433 around at the drive opening 127 that defines a recess in the divider 401 configured to receive and cooperate with the flange 413 and gasket 415 to form a seal when the drive-carrying assembly 409 is in the closed, stowed position. A secondary sealing component 435 can be positioned between the flange portion 413 and the protrusion 433, so as to facilitate sealing around the drive opening 127.

Figure 5:
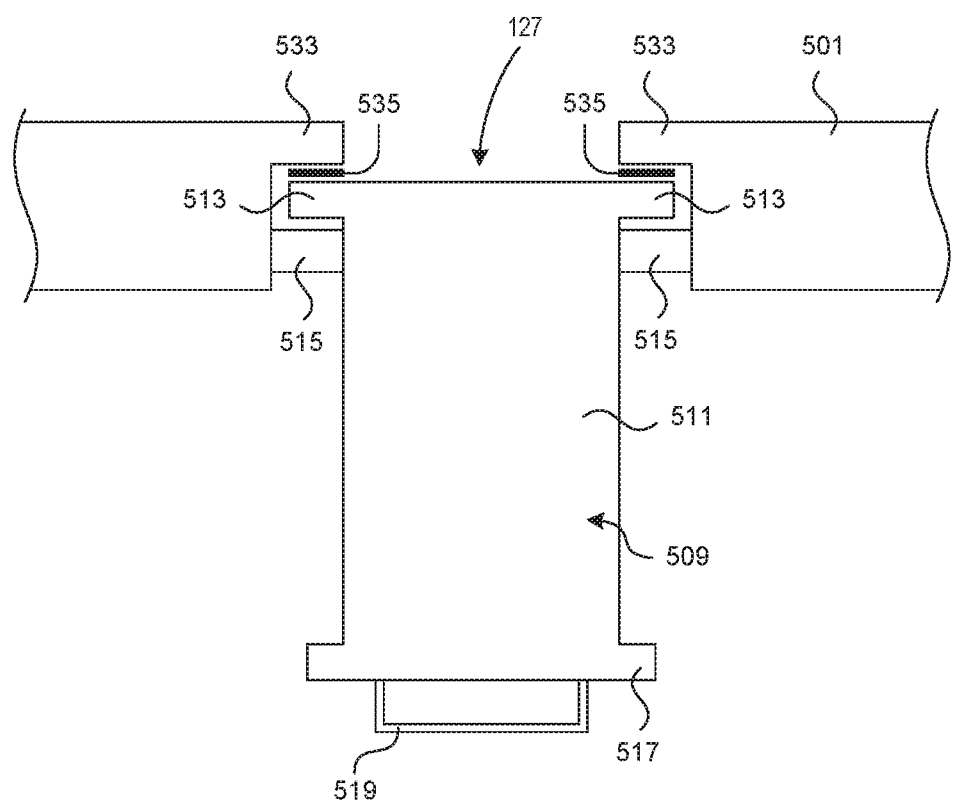
FIG. 5 is a top view of a sealing assembly in accordance with another embodiment of the present technology.

FIG. 5 is a top view of a drive-carrying assembly 509 in accordance with another embodiment of the present technology. The drive-carrying assembly 509 includes a drawer-style sled 511, a flange 513, and a gasket 515. The flange 513 extends laterally from the end portion of the sled 511, and the gasket 515 is attached to the end portion of the sled 511 just forward of the flange 513. The flange 513 and the gasket 515 are sealably received in a recess defined by a protrusion 533 in the divider 501 around the drive opening 127 when the drive-carrying assembly 509 is in the closed, stowed position. In the illustrated embodiment, a seal member 535 can be applied and positioned between the flange portion 513 and the protrusion 533, so as to facilitate sealing the drive opening 127 when the drive-carrying assembly 509 is in the closed, stowed position. In the illustrated embodiment, the panel portion 517 is positioned opposite to the flange portion 513. The handle portion 519 is coupled to the panel portion 517 and configured to enable an operator to operably move the drive-carrying assembly 509 between the open and closed positions.

Figure 6:
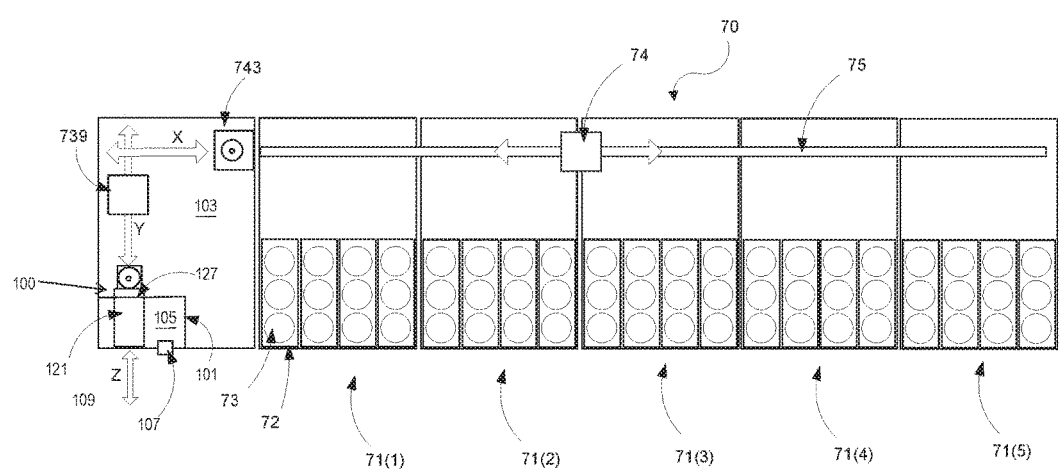
FIG. 6 is a top view of an enclosure system shown with an optical disc storage and retrieval system.

FIG. 6 is a schematic view of the enclosure system 100 cooperates with an optical disc storage and retrieval system 70. The optical disc storage and retrieval system 70 includes a plurality of storage units 71(1)-71(5). The storage units 71(1)-71(5) each include trays 72 that store discs 73. The optical disc storage and retrieval system 70 further includes a disc transport robot 74 and an inter-rack gear track 75. The disc transport robot 74 travels along the inter-rack gear track 75 to load and retrieve the discs 73 from the trays 72. The disc transport robot 74 then sends the retrieved discs 73 to the enclosure system 700 for further process.

The enclosure system 100 includes a stage 743 configured to receive and temporarily hold or store the discs 73 from the optical disc storage and retrieval system 70. The enclosure system 100 includes a disc drive 121 configured to access the discs 73 and a disc loader robot 739 configured to load/unload the discs 73 to/from the disc drive 121. The disc loader robot 739 can move along direction X and/or direction Y. The enclosure system 100 can be divided by the divider 101 into the a first area 103 and a second area 105, as discussed above. The first area 103 is in a controlled air quality condition that is suitable for loading or unloading discs 73. The second area 105 is in a controlled condition that is suitable for operating the disc drive 121. For example, the second area 105 can have a temperature-controlled environment most advantageous for operating the disc drive 121.

As shown in FIG. 6, a major portion of the disc drive 121 is positioned in the second area 105. The other portion of the disc drive 121 passes through the drive opening 127 of the divider 101 and extends to the first area 103. The drive opening 127 is sealed by the drive-carrying assembly 109 as discussed above. This arrangement enables the disc drive 121 to be operated in a space with proper ventilation (i.e., the second area 105) and the discs 73 can be loaded or unloaded in an area that has an acceptable air quality (i.e., the first area 103). When an operator wants to maintain or repair the disc drive 121, the operator can move the drive-carrying assembly 109 to pull disc drive 121 out of the opening 127 (along direction Z) and away from the divider 101 to expose the entire disc drive 121. Once completed, the operator can move the drive-carrying assembly 109 and the disc drive 121 back to the closed, stowed position (along direction Z), so as to reestablish the seal with the disc drive 121 around the drive opening 127, and the system can be again operated in the enclosure system 100.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "some embodiments" means that a particular feature, structure, or characteristic described in connection with the embodiments is included in at least one embodiment of the disclosure. The appearances of the phrase "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for certain embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

I claim:

1. A disc-drive enclosure system for use with a disc drive having a housing and an openable disc tray in an end portion of the housing, the system comprising:
an enclosure assembly having an interior area;
a divider positioned in the enclosure assembly and separating the interior area into first and second chambers, the divider having a drive opening configured to receive the end portion of the housing therein with the disc tray being openable into the first chamber, while a body portion of the housing remains in the second chamber; and
a sled assembly movably connected to the enclosure assembly and configured to support the disc drive, wherein the sled assembly with the disc drive thereon is movable relative to the divider between first and second positions, the sled assembly having a leading end portion and a sealing member coupled to the leading end portion and positioned to form a seal around the drive opening when the sled assembly is in the first position with the end portion of the housing in the first chamber and the body portion in the second chamber, and when the sled assembly is in the second position, the leading end portion and the sealing member are in the second chamber spaced apart from the divider and unsealed around the drive opening.

2. The system of claim 1 wherein the sealing member comprises a flange on the leading end portion of the sled assembly, and a seal connected to the flange and positioned to sealably engage the divider around the drive opening when the sled assembly is in the first position.

3. The system of claim 1, further comprising a seal coupled to the divider around the drive opening and positioned to sealably engage the leading end portion of the sled assembly when the sled assembly is in the first position.

4. The system of claim 1 wherein the sealing member comprises a flange on the leading end portion of the sled assembly, and a seal is coupled to the divider around the drive opening and sealably engaging the flange when the sled assembly is in the first position.

5. The system of claim 1, further comprising a sealing component positioned between the sealing member and the divider.

6. The system of claim 1 wherein the sled assembly includes a handle substantially opposite the leading end portion, wherein the handle is engagable by a user to move the sled assembly between the first and second positions.

7. The system of claim 1, further comprising an air mover coupled to the enclosure assembly and configured to ventilate the second chamber of the enclosure assembly when the sled assembly is in the first position with the seal formed around the drive opening.

8. The system of claim 1 wherein the sled assembly is a drawer.

9. The system of claim 1 wherein the disc drive is mounted on the sled assembly with the end portion of the housing adjacent to the leading end portion of the sled assembly and positioned at least partially in the drive opening when the sled assembly is in the first position.

10. A disc drive system, comprising:
a disc drive having a drive housing and a disc tray on a tray end portion of the drive housing;
an enclosure having a first chamber and a second chamber adjacent to the first chamber;
a separation structure positioned in the enclosure and separating the first and second chambers, wherein the separation structure has a drive opening therein extending between the first and second chambers; and
a drive support member carrying the disc drive and being slidably positioned in the second chamber, the drive support member being movable relative to the separation structure between open and closed positions, and the drive support member has a sealing flange and a seal member positioned adjacent to the sealing flange;
wherein when the drive support member is in the closed position, the drive support member holds the disc drive partially within the second chamber and with the tray end portion adjacent to the drive opening and positioned adjacent to the first chamber, and with the sealing flange and the seal member of the drive support member forming a seal fully around the drive opening and around the tray end portion therein such that the first chamber is substantially fully sealed from the second chamber; and
wherein when the drive support member is in the open position, the drive support member and the tray end portion of the disc drive are spaced away from the separation structure with the drive opening unsealed.

11. The system of claim 10, further comprising a drive-opening gasket positioned around the drive opening and configured to cooperate with the seal member.

12. The system of claim 10, further comprising a sealing component positioned between the sealing flange and the separation structure.

13. The system of claim 10, wherein the drive support member is a drawer with a handle positioned on an end of the drawer opposite to the sealing flange.

14. The system of claim 10, further comprising an air mover coupled to the enclosure and configured to ventilate the second chamber while the drive support member is in the closed position.

15. The system of claim 10, further comprising a media management device configured to access the disc drive when the drive support member is in the closed position.

16. The system of claim 10 wherein the drive support member is a tray assembly slidably mounted in the second chamber.

* * * * *